US012200851B1

(12) United States Patent
Roper

(10) Patent No.: US 12,200,851 B1
(45) Date of Patent: Jan. 14, 2025

(54) ELECTROCHEMICALLY RECIRCULATING ATOMIC BEAM SOURCE

(71) Applicant: HRL Laboratories, LLC, Malibu, CA (US)

(72) Inventor: Christopher S. Roper, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 583 days.

(21) Appl. No.: 17/526,091

(22) Filed: Nov. 15, 2021

Related U.S. Application Data

(60) Provisional application No. 63/147,653, filed on Feb. 9, 2021.

(51) Int. Cl.
*H05H 3/02* (2006.01)

(52) U.S. Cl.
CPC .................................... *H05H 3/02* (2013.01)

(58) Field of Classification Search
CPC H05H 3/02; H01J 49/10; H01J 49/168; H01J 27/00; H01J 27/02; H01J 27/022; H01J 27/024
USPC .......................... 250/251, 423 R, 424, 423 F
See application file for complete search history.

(56) References Cited

U.S. PATENT DOCUMENTS 3,578,834 A 5/1971 Porta et al.
4,495,478 A 1/1985 Kwon et al.
4,783,595 A * 11/1988 Seidl ........................ H05H 3/02 315/111.81
5,192,921 A 3/1993 Chantry et al.
7,126,112 B2 10/2006 Anderson et al.
(Continued)

FOREIGN PATENT DOCUMENTS

WO 1997012298 A1 4/1997
WO 2000043842 A2 2/2001

OTHER PUBLICATIONS

Svenja Knappe, MEMS Atomic Clocks, National Institute of Standards and Technology (NIST), Boulder, CO, USA Published by Elsevier B.V., Comprehensive Microsystems, vol. 3, pp. 571-612, Nov. 2007.
(Continued)

*Primary Examiner* — Jason L McCormack
(74) *Attorney, Agent, or Firm* — O'Connor & Company; Ryan P. O'Connor

(57) ABSTRACT

An atomic-beam source device is configured to provide a collimated beam of atoms, wherein solid-state electrochemistry is employed to recirculate atoms that are caught on collimation channel walls. The use of solid-state electrochemistry to recirculate atoms enables a chip-scale, dark-wall, high-quality collimated beam source that does not clog over time. Some variations provide an atomic-beam source device comprising: a first electrode; a second electrode that is electrically isolated from the first electrode; a first ion conductor interposed between the first electrode and the second electrode, wherein the first ion conductor is capable of transporting metal ions, and wherein the first ion conductor is in contact with the first electrode and with the second electrode; and one or more collimation channels disposed outwardly from the first ion conductor. Methods of using the atomic-beam source device are disclosed, including methods to recirculate and reuse metal atoms adsorbed on collimation channel walls.

29 Claims, 6 Drawing Sheets

(56) References Cited

U.S. PATENT DOCUMENTS

| | | | |
|---|---|---|---|
| 8,009,520 B2 | 8/2011 | Jau et al. | |
| 8,258,884 B2 | 9/2012 | Borwick, III et al. | |
| 8,624,682 B2 | 1/2014 | Ridley et al. | |
| 8,999,123 B2 | 4/2015 | Bernstein et al. | |
| 9,064,942 B2 | 6/2015 | Bangsaruntip et al. | |
| 9,077,354 B2 | 7/2015 | Strabley et al. | |
| 9,685,483 B2 | 6/2017 | Nazarian et al. | |
| 9,763,314 B1 * | 9/2017 | Roper | H05H 3/02 |
| 9,837,177 B1 | 12/2017 | Roper et al. | |
| 10,056,913 B1 | 8/2018 | Roper et al. | |
| 10,545,461 B1 | 1/2020 | Roper et al. | |
| 10,775,748 B1 | 9/2020 | Roper et al. | |
| 10,828,618 B1 | 11/2020 | Roper et al. | |
| 11,101,809 B1 | 8/2021 | Roper | |
| 2011/0247942 A1 | 10/2011 | Bernstein et al. | |
| 2014/0227548 A1 | 8/2014 | Myrick | |
| 2015/0226669 A1 | 8/2015 | Compton | |

OTHER PUBLICATIONS

Jonathan J. Bernstein et al., “All Solid-State Ion-Conducting Cesium Source for Atomic Clocks,” Solid State Ionics, vol. 198, No. 1, Sep. 2011.

Bernstein et al., “Solid State Electrochemical Alkali Sources for Cold Atom Sensing”, Solid-State Sensors, Actuators and Microsystems Workshop, Hilton Head Island, South Carolina, Jun. 5-9, 2016.

Wan et al., “Study on the First-Principles Calculations of Graphite Intercalated by Alkali Metal (Li, Na, K)”, Int. J. Electrochem. Sci., 10 (Feb. 24, 2015) 3177-3184.

* cited by examiner

ELECTROCHEMICALLY RECIRCULATING ATOMIC BEAM SOURCE

PRIORITY DATA

This patent application is a non-provisional application with priority to U.S. Provisional Patent App. No. 63/147,653, filed on Feb. 9, 2021, which is hereby incorporated by reference herein.

STATEMENT REGARDING FEDERALLY SPONSORED RESEARCH OR DEVELOPMENT

This invention was made with Government support under Contract No. FA8650-19-C-7903 awarded by the U.S. Department of Defense. The Government has certain rights in this invention.

FIELD OF THE INVENTION

The present invention generally relates to electrochemical atomic-beam source devices, and methods of using such devices.

BACKGROUND OF THE INVENTION

A collimated beam of light has parallel rays, and therefore will spread minimally as it propagates. Other forms of electromagnetic radiation, as well as particle beams, can also be collimated. A collimated beam of atoms typically utilizes shielding blocks of high-density materials to absorb or block peripheral particles that are not transporting in a desired forward direction.

There is currently a need to provide a collimated beam of atoms for atomic and quantum instruments in a small package with low power draw. Current collimated beam sources are >10 cm$^3$ (typically >40 cm$^3$) in size and require several watts of power. These conventional sources require too much power for miniature atomic instruments where the power budget is typically less than 1 W.

Papers describing recirculating and non-recirculating atomic beam sources include Drullinger et al., "A Recirculating Oven for Atomic Beam Frequency Standards", 39*th Annual Symposium on Frequency Control*, Philadelphia, Pennsylvania, USA (1985), pp. 13-17; Ross and Sonntag, "High temperature metal atom beam sources", *Review of Scientific Instruments* 66, 4409 (1995); and Senaratne et al., "Effusive atomic oven nozzle design using an aligned microcapillary array", *Review of Scientific Instruments* 86, 023105 (2015), each of which is incorporated by reference. These sources are large and power-intensive, which makes them ill-suited for incorporation into a compact, portable atomic instrument.

Atomic beam collimators have been miniaturized and microfabricated. See Senaratne et al., "Effusive atomic oven nozzle design using an aligned microcapillary array", *Review of Scientific Instruments* 86, 023105 (2015) and Li et al., "Cascaded collimator for atomic beams traveling in planar silicon devices", *NATURE COMMUNICATIONS* 10:1831 (2019), each of which is incorporated by reference. However, without atom recirculation, these devices will clog, thus limiting device lifetime. Clogging is worse with microfabricated collimators because microfabricated collimators catch off-axis atoms on a much smaller area, thus accelerating the growth of films of caught off-axis atoms and consequent clogging of atoms.

Collimated atomic-beam sources have importance for many applications, including (but not limited to) cold atom systems, atomic clocks, communication system switches and buffers, single-photon generators and detectors, gas-phase sensors, nonlinear frequency generators, precision spectroscopy instrumentation, accelerometers, gyroscopes, magnetometers, electrometers, gravitometers, gradiometers (including magnetic gradiometers and gravity gradiometers), quantum memories, molecular-beam epitaxy, atomic-layer deposition, and semiconductor surface doping.

SUMMARY OF THE INVENTION

The present invention addresses the aforementioned needs in the art, as will now be summarized and then further described in detail below.

Some variations provide an atomic-beam source device comprising:

a first electrode;

a second electrode that is electrically isolated from the first electrode;

a first ion conductor interposed between the first electrode and the second electrode, wherein the first ion conductor is capable of transporting metal ions, and wherein the first ion conductor is in contact with the first electrode and with the second electrode; and one or more collimation channels disposed outwardly from the first ion conductor, wherein the collimation channels are surrounded by collimation channel walls.

In some embodiments, the first electrode contains a porous and permeable electrically conductive layer or structure. In certain embodiments, the first electrode contains a mixed ion-electron conductive layer or structure.

In some embodiments, the second electrode contains an atom-transporting phase capable of storing and transporting neutral metal atoms. The neutral metal atoms are preferably reduced forms of the metal ions. The metal ions may be selected from alkali metal ions, alkaline earth metal ions, rare earth metal ions, mercury ions, or a combination thereof. For example, the metal ions may be selected from the group consisting of $Rb^+$, $Cs^+$, $Ca^{2+}$, $Na^+$, $K^+$, $Sr^{2+}$, $Li^+$, $Yb^{3+}$, $Hg^{2+}$, and combinations thereof.

In some embodiments, the second electrode is encapsulated by the first ion conductor and a reservoir wall.

The first ion conductor may comprise a solid electrolyte. In some embodiments, the first ion conductor comprises a material selected from the group consisting of β-alumina, β"-alumina, NASICON, LISICON, KSICON, chalcogenide glasses, and combinations thereof.

In some embodiments, the collimation channel walls contain a third electrode. The third electrode may be disposed discontinuously on the collimation channel walls. Alternatively, the third electrode may be disposed continuously on the collimation channel walls.

In some embodiments, the third electrode contains a porous and permeable electrically conductive material.

In some preferred embodiments, the third electrode contains a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

In some embodiments, the third electrode contains a mixed ion-electron conductive material.

The atomic-beam source device may further comprise a second ion conductor that is capable of transporting the metal ions. The second ion conductor may be the same material as the first ion conductor, or they may be different materials. In some embodiments, the second ion conductor is in direct contact with the first ion conductor.

The second ion conductor may comprise a solid electrolyte. In some embodiments, the second ion conductor comprises a material selected from the group consisting of β-alumina, β"-alumina, NASICON, LISICON, KSICON, chalcogenide glasses, and combinations thereof.

The second ion conductor (when present) may be a coating disposed on a dielectric or electron-conducting collimation channel wall substrate. In these embodiments, the dielectric or electron-conducting collimation channel wall substrate need not be ion-conducting, since the coating itself is ion-conducting.

In embodiments in which the collimation channel walls contain a third electrode, the second ion conductor may be in ionic communication with the third electrode and with the first ion conductor.

In some embodiments, the atomic-beam source device further comprises a fourth electrode disposed at an interface between a first ion conductor and a second ion conductor.

Some variations of the invention provide a method of electrochemically recirculating atoms adsorbed on atom-beam collimator channel walls, the method comprising:

(a) providing an atomic-beam source device that emits a metal vapor of neutral metal atoms, wherein the atomic-beam source device comprises (i) a first electrode; (ii) a second electrode that is electrically isolated from the first electrode; (iii) a first ion conductor interposed between the first electrode and the second electrode, wherein the first ion conductor is capable of transporting metal ions, and wherein the first ion conductor is in contact with the first electrode and with the second electrode; and (iv) one or more collimation channels disposed outwardly from the first ion conductor, wherein the collimation channels are surrounded by collimation channel walls;

(b) applying a first voltage between the first electrode and the second electrode to source the metal vapor out of the collimation channels, wherein a portion of the metal vapor adsorbs onto collimation channel walls as adsorbed metal atoms; and (c) applying a second voltage between the first electrode and the second electrode to recirculate at least some of the adsorbed metal atoms from the collimation channel walls to the first electrode and/or to the second electrode.

In some methods, the second voltage is selected to recirculate at least some of the adsorbed metal atoms to the first electrode. In these or other methods, the second voltage is selected to recirculate at least some of the adsorbed metal atoms to the second electrode. In certain embodiments, the method comprises repeatedly applying the first voltage to source the metal vapor out of the collimation channels and then applying the second voltage to recirculate at least some of the adsorbed metal atoms from the collimation channel walls to the second electrode and/or to the first electrode.

Preferably, application of the second voltage between the first electrode and the second electrode recirculates at least 90% of the adsorbed metal atoms from the collimation channel walls to the first electrode and/or to the second electrode.

Other variations of the invention provide a method of electrochemically recirculating atoms adsorbed on atom-beam collimator channel walls, the method comprising:

(a) providing an atomic-beam source device that emits a metal vapor of neutral metal atoms, wherein the atomic-beam source device comprises (i) a first electrode; (ii) a second electrode that is electrically isolated from the first electrode; (iii) a first ion conductor interposed between the first electrode and the second electrode, wherein the first ion conductor is capable of transporting metal ions, and wherein the first ion conductor is in contact with the first electrode and with the second electrode; and (iv) one or more collimation channels disposed outwardly from the first ion conductor, wherein the collimation channels are surrounded by collimation channel walls; and (b) applying one or more voltages between the first electrode and the second electrode to source the metal vapor out of the collimation channels, wherein, during application of the one or more voltages, a portion of the metal vapor adsorbs onto collimation channel walls as adsorbed metal atoms, and wherein, during application of the one or more voltages, at least some of the adsorbed metal atoms are recirculated from the collimation channel walls to the first electrode and/or to the second electrode.

In some methods, the one or more voltages are selected to recirculate at least some of the adsorbed metal atoms to the first electrode. In these or other methods, the one or more voltages are selected to recirculate at least some of the adsorbed metal atoms to the second electrode.

In some embodiments, application of the one or more voltages preferably recirculates at least 90% of the adsorbed metal atoms from the collimation channel walls to the first electrode and/or to the second electrode.

BRIEF DESCRIPTION OF THE DRAWINGS

Some variations can be understood by reference to the drawings, which are exemplary and not intended to limit the scope of the invention. The drawings are not drawn to scale. The regions and layers of FIGS. 1 to 4 may be repeated or extended in any dimension. Also, in FIGS. 1 to 4, other regions, layers, and additives may be present, and the depicted structure may be part of a larger system.

DETAILED DESCRIPTION OF EMBODIMENTS OF THE INVENTION

Figure 1:
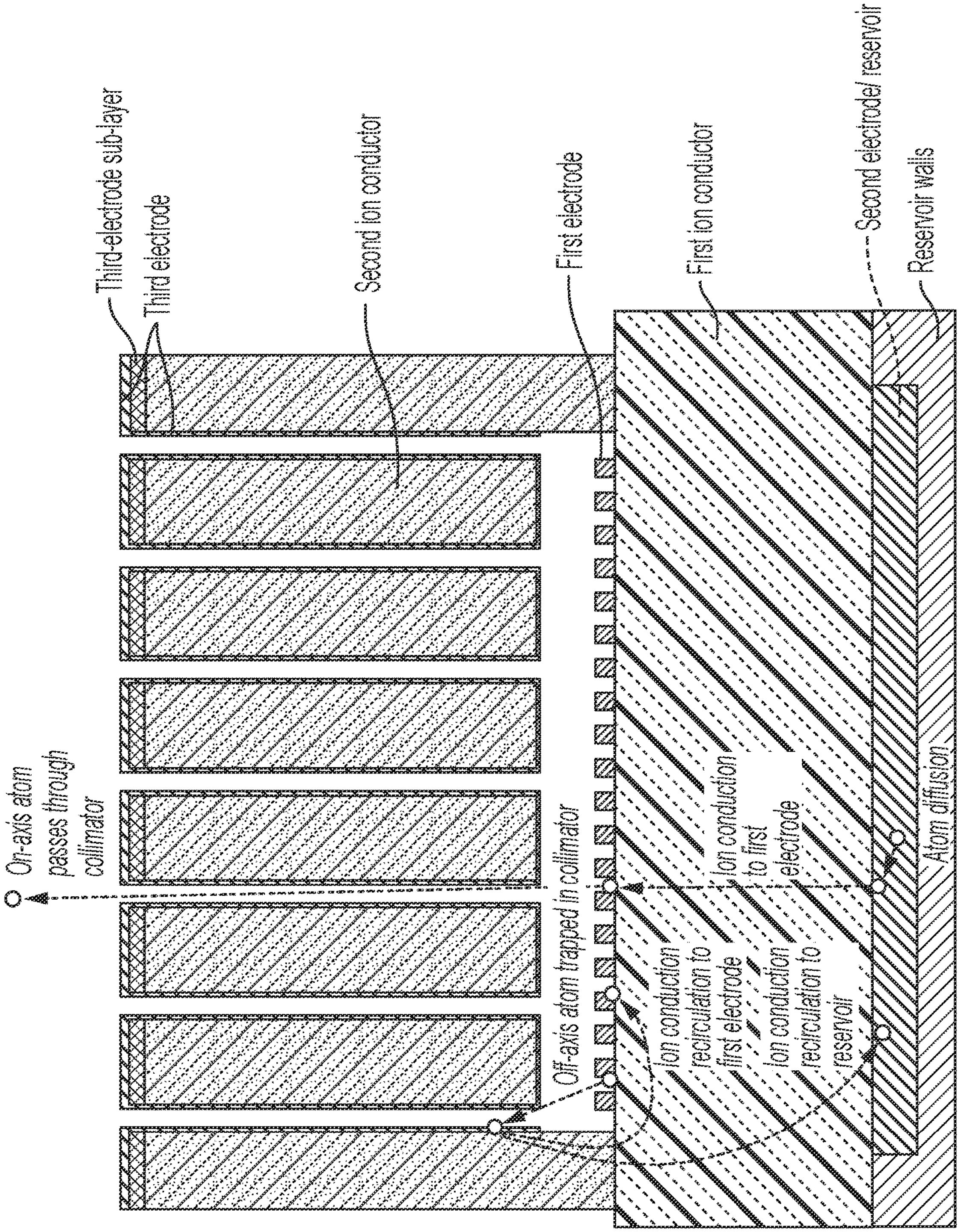
FIG. 1 is a two-dimensional, cross-sectional side view of an atomic-beam source device, or a portion thereof, in some embodiments.

The structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of the invention are predicated on an atomic-beam source device configured to provide a collimated beam of atoms, wherein solid-state electrochemistry is employed to recirculate atoms that are caught on collimation channel walls. The use of solid-state electrochemistry to recirculate atoms enables a chip-scale, dark-wall, collimated beam source that (1) does not clog over time and (2) achieves a higher-quality beam (narrower beam profile) than conventional bright-wall collimated beam sources or recirculating collimated beam sources utilizing capillary pressure for recirculation flow.

The disclosed atomic-beam source device provides a high-quality collimated atomic beam because the device combines the benefits of a dark-wall source with a recirculating source. Typically, recirculating sources are configured to return hot liquid metal along the capillary length. This hot metal emits atoms from the walls of the collimator. These atoms are not subjected to the entire length of the collimator, which contributes to a wider beam. By instead removing the adsorbed atoms from the collimator walls via electrochemistry, according to the present invention, the adsorbed atoms are not able to be re-emitted back to the vapor path at an undesirable angle. Conventional bright-wall collimators with hot walls, by contrast, allow significant re-emission of atoms that had been temporarily adsorbed on collimator walls. Avoiding bright-wall re-emission improves the atomic beam quality versus the prior art.

Another benefit of the atomic-beam source device is low power. The atomic-beam source device does not require a liquid phase of metal for capillary-driven recirculation from collimation channel walls. By avoiding the need to heat the collimator to keep the metal liquid, the power requirements are significantly reduced.

Optimal collimation to create a narrowed beam profile usually requires a high aspect ratio of length (L) to diameter (D) of the collimator. The minimum diameter D, and thus the minimum length L at fixed L/D, is limited in capillary-flow recirculating ovens because collimation channels that are too narrow will have a capillary pressure that competes with the recirculation pores, thereby clogging the collimation channels with liquid metal. Using electrochemical transport for recirculation avoids this problem. The atomic-beam source device disclosed herein may advantageously have a high aspect ratio L/D in a short length L, since the channel diameter D may be small.

The disclosed invention provides a collimated beam of atoms for atomic and quantum instruments in a small package with low power draw. The atomic-beam source device may be used in various applications, including (but not limited to) portable atomic instruments, sensors, atomic clocks, gyroscopes, thin-film evaporation, molecular-beam epitaxy, atomic-layer deposition, and semiconductor surface doping. In some embodiments, the atomic-beam source device is arranged to supply multiple atoms for the purposes of one or more measurements based on those atoms. Measurements are usually spectroscopy-based, using lasers and/or RF to measure an external field or an energy level of the atoms. The atomic-beam source device may be, or be contained within, a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, or an atom dispenser system, for example.

Some variations provide an atomic-beam source device comprising:

- a first electrode;
- a second electrode that is electrically isolated from the first electrode;
- a first ion conductor interposed between the first electrode and the second electrode, wherein the first ion conductor is capable of transporting metal ions, and wherein the first ion conductor is in contact with the first electrode and with the second electrode; and
- one or more collimation channels disposed outwardly from the first ion conductor, wherein the collimation channels are surrounded by collimation channel walls.

The atoms that are collimated and emitted (as atomic vapor) from the atomic-beam source device may be alkali metal atoms, alkaline earth metal atoms, rare earth metal atoms, mercury, or a combination thereof. For example, the metal atoms may be selected from the group consisting of Rb, Cs, Ca, Na, K, Sr, Li, Yb, Hg, and combinations thereof. Other metal atoms may be collimated and emitted from the atomic-beam source device, including Si, Ga, Al, In, As, Sb, Ge, Sn, Pb, Mg, Ba, Te, Au, Pt, Cr, and Cd, for example.

An "electrode" is a region that is electrically conductive or includes one or more material phases that are themselves electrically conductive. The first electrode permits the conduction of electrons and is in contact with the first ion conductor (discussed below). The first electrode permits (a) conduction of the same ionic species as conducted by the first ion conductor, (b) diffusion of a reduced form of the same ionic species as conducted by the first ion conductor, or both (a) and (b).

In some embodiments, the first electrode is a porous electrically conductive structure. In some embodiments, the first electrode is a selectively permeable electrically conductive layer. For example, see U.S. Pat. No. 10,545,461 to Roper et al, which is incorporated by reference herein. In this patent application, "selectively permeable" refers to the transport of metal atoms through the electrode, by diffusion or conduction. In some embodiments, the first electrode is a mixed ion-electron conductor. For example, see U.S. Pat. No. 10,828,618 to Roper et al, which is incorporated by reference herein.

The first electrode is preferably a porous electrically conductive layer. The porous electrically conductive layer is preferably a patterned metal layer directly on one surface of the first ion conductor. The metal layer is preferably thin, such as less than 1 micron in thickness, more preferably less than 200 nanometers or less than 100 nanometers in thickness. The pattern of the metal layer is preferably such that metal regions are closely spaced, such as less than 100-micron line pitch, more preferably less than 10-micron line pitch, and most preferably less than 2-micron line pitch. In some embodiments, the patterned metal layer is a grid pattern. In some embodiments, the patterned metal layer is a stripe pattern. The metal layer may be patterned with photolithography, electron-beam lithography, direct-write lithography, direct-write metal deposition (e.g., ion beam-induced deposition), interference lithography, etc.

Exemplary electrode materials for the porous electrically conductive layer include Pt, Mo, W, Ni, Cu, Fe, Al, and combinations thereof. The porous electrically conductive layer may also entail more than one layer, such as a Ti adhesion layer and a Pt layer.

The porous electrically conductive layer preferably does not chemically interact with the ionic species conducted by the first ion conductor. For example, the porous electrically conductive layer preferably does not form an intermetallic phase and does not chemically react with the ionic species other than enabling electrochemical oxidation and reduction. Additionally, the porous electrically conductive layer preferably does not chemically interact with the first ion conductor itself, other than possible chemical bonding to adhere to the surface of the first ion conductor. For example, portions of the porous electrically conductive layer preferably do not form mobile ions that are transported to the first ion conductor.

In some embodiments, the first electrode has a high diffusivity for the metal atoms that are collimated. The metal atoms which comprise the atomic vapor have a diffusivity in the first electrode that is preferably at least about $10^{-10}$ $cm^2/s$ and more preferably at least about $10^{-6}$ $cm^2/s$, measured at 25° C. or at a device operation temperature.

The first electrode is at least a fair electrical conductor. The electrical resistivity of the first electrode is preferably less than 10 kΩ·cm, more preferably less than 1 kΩ·cm, and most preferably less than 1 Ω·cm, measured at 25° C.

In some embodiments, the first electrode comprises an intercalation compound, which is a material capable of being intercalated with atoms of the atomic vapor. In some embodiments, the intercalation compound is graphite, $MoS_2$, $TaS_2$, or a combination thereof, for example. The intercalation compound may be disposed in a uniform layer that consists essentially of the intercalation compound and any intercalated atoms. The thickness of the intercalation compound layer is preferably less than 100 microns and more preferably less than 10 microns.

In some embodiments, the first electrode comprises particles of an intercalation compound in a matrix. The matrix is preferably a polymer binder, such as (but not limited to) poly(vinylpyrrolidone) poly(methacrylate), poly(methyl methacrylate), poly(ethyl methacrylate), poly(2-hydroxyethyl methacrylate), fluoroelastomers, cellulose resin, or a combination thereof. The polymer binder preferably has low outgassing at device operating temperature and is compatible with ultra-high vacuum. Matrix additives may be included to increase the electrical conductivity of the first electrode. For example, small conductive carbon particles may be included (e.g. Super-P® carbon black).

The first electrode may also include a region and/or layer with high electrical conductivity to minimize sheet resistance of the first electrode. For example, the first electrode may consist of two layers: a layer that is substantially graphite and a layer that is a porous electrically conductive layer, such as a thin platinum mesh. This layered configuration may be beneficial to ensure that the electrical potential, when applied, does not vary considerably (e.g., <0.1 V) across the electrode surface even if an intercalation material has mediocre electrical conductivity or if an intercalation material is very thin. The highly electrically conductive layer may include Pt, Mo, W, or a combination thereof. The highly electrically conductive layer may also entail more than one sub-layer, such as a Ti adhesion sub-layer and a Pt sub-layer. The highly electrically conductive layer preferably does not form an intermetallic phase with, or otherwise chemically react with, the ionic species. The highly electrically conductive layer preferably does not chemically interact with the first ion conductor.

In some embodiments, the first electrode is a mixed ion-electron conductor, which means that the first electrode is both an ion conductor and an electron conductor. The mixed ion-electron conductor preferably has an electrical sheet resistance less than 10 MΩ/□ (10 million ohms per square), more preferably less than 100 kΩ/□, and most preferably less than 1 kΩ/□. The electrical resistivity of the mixed ion-electron conductor is preferably less than 100 kΩ·cm, more preferably less than 10 kΩ·cm, and most preferably less than 100 Ω·cm. The ionic conductivity of the mixed ion-electron conductor is preferably at least $10^{-12}$ $\Omega^{-1}\cdot cm^{-1}$, more preferably at least $10^{-9}$ $\Omega^{-1}\cdot cm^{-1}$, and most preferably at least $10^{-6}$ $\Omega^{-1}\cdot cm^{-1}$. The ionic conductance of the mixed ion-electron conductor, through the thickness of the electrode, is preferably less than 10 kΩ, more preferably less than 1 kΩ, and most preferably less than 100Ω.

Exemplary doped mixed ion-electron conductors include, but are not limited to, $Rb_{1-2x}M_xAlO_2$ (x is from 0 to less than 0.5) wherein M=Pb, Cd, and/or Ca; $Rb_{2-2x}Fe_{2-x}M_xO_4$ (x is from 0 to 1) wherein M=P, V, Nb and/or Ta; $Rb_{2-2x}Ga_{2-x}M_xO_4$ (x is from 0 to 1) wherein M=P, V, Nb and/or Ta; $Rb_{2-2x}Al_{2-x}M_xO_4$ wherein M=P, V, Nb and/or Ta; and $Rb_{1-x}Al_{1-x}M_xO_2$ (x is from 0 to less than 1) wherein M=Si, Ti, and/or Ge.

In some embodiments, the mixed ion-electron conductor material may be selected from alkali pyrophosphates, such as $Rb_4P_2O_7$. The alkali pyrophosphate is optionally doped with one or more atoms selected from Ca, Sr, Ba, Pb, Y, La, and/or Nd, for example. Exemplary compounds for the doped alkali pyrophosphates include, but are not limited to, $Rb_{4-2x}M_xP_2O_7$ (x is from 0 to less than 2) wherein M=Ca, Sr, Ba, and/or Pb; and $Rb_{3-3x}M_xPO_4$ (x is from 0 to less than 1) wherein M=Y, La, and/or Nd.

In some embodiments, the mixed ion-electron conductor is a uniform layer that consists essentially of the mixed ion-electron conductor. The thickness of the mixed ion-electron conductor material is preferably about 500 microns or less, and more preferably about 100 microns or less.

In some embodiments employing a mixed ion-electron conductor, the first electrode comprises a region or layer with high electrical conductivity to minimize the electrical sheet resistance of the first electrode. For example, the first electrode may include two layers: a layer that is a mixed ion-electron conductor and a layer that is a highly electrically conductive layer (e.g., a thin Pt mesh). The layered configuration allows for the electrical potential, when applied, to not vary considerably (e.g., <0.1 V) across the electrode surface even if the mixed ion-electron conductor has mediocre electrical conductivity or if the mixed ion-electron conductor is very thin. The highly electrically conductive layer may include Pt, Mo, W, or a combination thereof. The highly electrically conductive layer may itself include sub-layers, such as a Ti adhesion sub-layer and a Pt sub-layer. The highly electrically conductive layer preferably does not chemically interact with the ionic species and preferably does not form an intermetallic phase with the ionic species. Also, the highly electrically conductive layer preferably does not chemically interact with the first ion conductor. For example, when the highly electrically conductive layer contains Pt, preferably $Pt^{2+}$ or other platinum ions do not become mobile ions within the first ion conductor.

The second electrode is preferably in contact with the first ion conductor. The second electrode is not in electrical contact with the first electrode. The second electrode (equivalently, the "second electrode/reservoir") contains at least a second-electrode first phase that stores and transports neutral atoms. Transport of neutral atoms is preferably via diffusion, and storage of neutral atoms is preferably via intercalation.

In this specification, neutral atoms include excited states of atoms (e.g., neutral sodium $Na^0$ may be present as excited sodium Na*). An excited-state electron configuration of an atom occurs when a valence electron is promoted to a higher energy state, but the atom is still neutral unless an electron is lost or gained.

The atomic species contained within the second-electrode first phase are preferably a reduced form of the same ionic species as in the first ion conductor. Alternatively, or additionally, a different atomic species may be contained within the reservoir. For example, when the device is sourcing atoms, Na may be contained within the second electrode/reservoir and may be oxidized, while Rb may be reduced at the first electrode.

The second-electrode first phase is preferably graphite. The second-electrode first phase may include predominately $sp^2$-bonded carbon. Examples of $sp^2$-bonded carbon include, but are not limited to, graphite, monolayer graphene, few-layer graphene, graphene flakes, holey graphene (perforated graphene), carbon nanotubes, fullerenes (e.g., $C_{60}$, $C_{70}$, etc.), polyaromatic hydrocarbons (e.g., pentacene, rubrene, hexabenzocoronene, coronene, etc.), chemical-vapor-deposited graphitic carbon, pyrolyzed carbon-containing molecules or polymers include pyrolyzed parylenes (e.g., pyrolyzed poly(para-xylylene) or analogues thereof), or combinations of the foregoing.

The second-electrode first phase may alternatively, or additionally, include a metal dichalcogenide. In various embodiments, the second-electrode first phase includes a transition metal oxide (e.g., ZnO), a transition metal sulfide (e.g., $MoS_2$ or $TaS_2$), a transition metal selenide (e.g., $TiSe_2$), or a transition metal telluride (e.g., $TiTe_2$).

The second-electrode first phase is preferably in the form of particles. It is preferable that the particles have at least one dimension that is relatively short to reduce the diffusion length for neutral atoms, thereby improving the transport rate. The particles of the second-electrode first phase may have a minimum dimension (e.g., diameter of spheres or rods) of less than 1000 microns, less than 500 microns, less than 100 microns, less than 50 microns, less than 10 microns, less than 5 microns, less than 1 micron, or less than 500 nanometers, for example. In preferred embodiments, the particles of the second-electrode first phase have a minimum dimension selected from about 100 nanometers to about 20 microns. Particle sizes may be measured by a variety of techniques, including dynamic light scattering, laser diffraction, image analysis, or sieve separation, for example.

The second-electrode first phase is preferably a continuous phase or a semi-continuous phase. For example, the second-electrode first phase may be or include a carbon aerogel, a carbonized polymer, or reticulated vitreous carbon foam.

The second electrode is preferably electrically conductive. In various embodiments, the electrical resistivity of the second electrode is preferably less than 10 kΩ·cm, more preferably less than 1 kΩ·cm, even more preferably less than 100 Ω·cm, and most preferably less than 10 Ω·cm, measured at 25° C.

The thickness of the second electrode may be selected from about 1 micron (or less) to about 100 microns (or more). Typically, the second electrode is thicker than the first electrode or the third electrode.

In addition to the first phase, the second electrode may contain one or more other phases to form a composite electrode/reservoir. For example, see U.S. Pat. No. 10,545,461 to Roper et al, which has been incorporated by reference herein. An additional phase may be an atom-transporting phase that stores and transports neutral atoms. Transport of neutral atoms is preferably via diffusion. At a fixed point in time, neutral atoms may be in the process of being transported into or out of the atom-transporting phase, may be stored at a fixed location within the atom-transporting phase, or may be moving within the atom-transporting phase but not across its phase boundary, and therefore stored within that phase. Transport of neutral atoms within the atom-transporting phase and/or across its phase boundaries may occur via various diffusion mechanisms, such as (but not limited to) bulk solid diffusion, porous diffusion, surface diffusion, grain boundary diffusion, permeation, solubility-diffusion, etc. Storage of neutral atoms is preferably via intercalation. Storage of neutral atoms also results when the diffusion rate of metal atoms is negligible (e.g., less than $10^{-10}$ $cm^2/s$).

In the atom-transporting phase of the second electrode, the selected metal atoms may have a diffusion coefficient of at least about $10^{-10}$ $cm^2/s$, $10^{-9}$ $cm^2/s$, $10^{-8}$ $cm^2/s$, $10^{-7}$ $cm^2/s$, $10^{-6}$ $cm^2/s$, or $10^{-5}$ $cm^2/s$, measured at the device-operation temperature, such as 25° C., 100° C., 150° C., or 200° C. The metal-atom diffusion in the second electrode as a whole will depend on the bulk diffusivity of the atom-transporting phase, the volume fraction of the atom-transporting phase, and the connectivity/tortuosity of atom-transporting phase.

The atomic species contained in the atom-transporting phase is preferably the reduced (neutral charge) form of at least one of the ionic species contained in the first ion conductor. Alternatively, or additionally, the atom-transporting phase may contain an atomic species that is different than the species contained in the first ion conductor. For example, when the device is configured to source atoms, Na may be contained within the atom-transporting phase, Na may be oxidized to $Na^+$ at the second electrode, $Rb^+$ may be reduced to Rb at the first electrode, and the first ion conductor may contain both $Na^+$ and $Rb^+$.

The atom-transporting phase and/or the second-electrode first phase preferably contain an intercalable compound that is capable of being intercalated by at least one element in ionic and/or neutral form. As used herein, an "intercalable compound" (or "intercalatable compound") is a host material that is capable of forming an intercalation compound with guest atoms which comprise the atomic vapor whose density is being controlled. Stated another way, the intercalable compound is intercalative for (capable of intercalating) at least some of the atoms in the atomic vapor. The guest atoms that are intercalated may be neutral atoms, ionic species, or a combination thereof. Typically, the guest atoms are intercalated as neutral atoms.

In some embodiments, the host material actually contains the guest species, resulting in a material which may be referred to as an "intercalation compound." It is noted that for the purposes of this patent application, any reference to intercalable compound may be replaced by intercalation compound, and vice-versa, since an intercalable compound must be capable of intercalating a guest species but may or may not actually contain the intercalated guest species.

"Intercalation" herein is not limited to the reversible inclusion or insertion of an atom, ion, or molecule sandwiched between layers present in a compound, which shall be referred to herein as "layer intercalation." Intercalation also includes absorption of neutral atoms or ionic species into a bulk phase of the compound, whether that phase is amorphous or crystalline; adsorption of neutral atoms or ionic species onto an outer surface or an internal surface (e.g., a phase boundary) present in the compound; and reversible chemical bonding between the neutral atoms or ionic species, and the compound.

Some embodiments of the invention utilize layer intercalation, in which a guest species such as K expands the van der Waals gap between sheets of a layered compound such as graphite. This layer expansion requires energy. Without being limited by theory, the energy may be supplied by electrical current to initiate charge transfer between the guest (e.g., K) and the host solid (e.g., graphite). In this example, potassium graphite compounds such as $KC_8$ and $KC_{24}$ may be formed. These compounds are reversible, so that when the electrical current is adjusted, the potassium graphite compounds may give up the intercalated atoms (K). Those previously intercalated atoms may be released into the vapor phase or into the first ion conductor, for example. Electrical energy may be supplied to cause a chemical potential change at the interface with the intercalable compound, which then causes layer expansion.

In some embodiments, the intercalable compound is a carbonaceous material, such as a material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

The intercalable carbonaceous material may be at least 50 wt % carbon, preferably at least 75 wt % carbon, more preferably at least 90 wt % carbon, most preferably at least 95 wt % carbon. In some embodiments, the carbonaceous material is essentially pure carbon, except for impurities. The carbonaceous material may include mesoporous carbon, microporous carbon, nanoporous carbon, or a combination thereof.

The intercalable carbonaceous material may be a form of predominately $sp^2$ bonded carbon. Examples of $sp^2$ bonded carbon include, but are not limited to, graphite, graphene, carbon nanotubes, carbon fibers, fullerenes (e.g. $C_{60}$ or $C_{70}$), pyrolyzed carbon-containing molecules or polymers (such as pyrolyzed parylene, e.g. parylene-N, parylene-C, or parylene-AF-4), and large polyaromatic hydrocarbons (e.g. pentacene, rubrene, hexabenzocoronene, or coronene). In the case of graphene (which is essentially a single layer of graphite), the graphene may be monolayer graphene or multiple layers of graphene. Graphene flakes (a few layers of graphene) may be utilized. Certain embodiments utilize monolayer holey graphene, multiple layers of holey graphene, or graphene platelets.

In certain embodiments, the carbonaceous material comprises graphite. Graphite consists of planes of carbon sheets. Metal atoms, especially alkali atoms, readily intercalate between these carbon sheets, leading to a high diffusivity for those atoms. Graphite electrodes enable fast metal transport at low voltages and low power consumption per atom removed. Graphite not only transports atoms via intercalation, but also is electrically conductive due to the electron delocalization within the carbon layers. Valence electrons in the carbon are free to move, thereby conducting electricity through the graphite.

The graphite may be natural graphite (e.g., mined graphite) or synthetic graphite produced from various techniques. For example, graphite may be obtained from chemical-vapor-deposited graphitic carbon, carbide-derived graphite, recycled graphite, waste from graphene manufacture, and so on. Crystalline flake graphite occurs as isolated, flat, plate-like particles with hexagonal edges if unbroken; when broken the edges can be irregular or angular. Amorphous graphite is very fine flake graphite. Lump graphite occurs in fissure veins or fractures and appears as massive platy intergrowths of fibrous or acicular crystalline aggregates. Highly oriented pyrolytic graphite is graphite with an angular spread between the graphite sheets of less than 1°.

The graphite may be crystalline, amorphous, or a combination thereof. The graphite crystallinity may range from about 10% to about 90%, for example. A mixture of crystalline and amorphous graphite may be beneficial for intercalation not only between crystal layers but also between crystalline and amorphous regions of the graphite. With too much crystallinity, the diffusivity becomes highly anisotropic. If highly crystalline (i.e. highly anisotropic) graphite is oriented with the low-diffusivity axis normal to the surface of the device (which is a typical orientation), reduced alkali flux, and thus reduced performance, would result.

In some embodiments, the intercalable compound of the atom-transporting phase is a transition-metal oxide, a transition-metal dichalcogenide, or a combination thereof. The intercalable compound may also be a mixture of a carbonaceous material and a transition-metal oxide, or a mixture of a carbonaceous material and a transition-metal dichalcogenide, or a mixture of all of these materials. Specifically, the intercalable compound may be a metal dichalcogenide selected from $MoS_2$, $TaS_2$, $TiTe_2$, or any other transition metal dioxide, disulfide, diselenide, or ditelluride.

The second electrode is preferably encapsulated by the first ion conductor and one or more reservoir walls. The encapsulation may be a single encapsulate (e.g., ultrahigh vacuum epoxy) or a bonded substrate employing ultrahigh vacuum epoxy or thermocompression-bonded silicon, borosilicate glass, or alumina die, for example.

The first ion conductor preferably has high ionic conductivity for a selected ionic species. The ionic conductivity is preferably at least $10^{-7}$ S/cm, and more preferably at least $10^{-5}$ S/cm, measured at 25° C. or at a device operating temperature. The ionic species may be an ionized form of an atom of interest in atomic physics and atomic measurement instruments. In various embodiments, the ionic species is selected from the group consisting of $Li^+$, $Na^+$, $K^+$, $Rb^+$, $Cs^+$, $Sr^{2+}$, $Ca^{2+}$, $Yb^{3+}$, $Hg^{2+}$, and combinations thereof (i.e., multiple ions may be present in the device).

The first ion conductor preferably includes a solid electrolyte. For example, the first ion conductor may be a large fraction (>50% by weight) β-alumina, β"-alumina, or a combination of β-alumina and β"-alumina. β-alumina and β"-alumina are good conductors of their mobile ions yet allow negligible non-ionic (i.e., electronic) conductivity. β"-alumina is a hard polycrystalline or monocrystalline ceramic material. β-alumina and/or β"-alumina are also referred to herein as "beta-alumina." When prepared as a solid electrolyte, beta-alumina is complexed with a mobile ion, such as $Na^+$, $K^+$, $Li^+$, $Rb^+$, $Cs^+$, $Sr^{2+}$, or $Ca^{2+}$, in which case the material becomes sodium-beta-alumina, potassium-beta-alumina, lithium-beta-alumina, rubidium-beta-alumina, cesium-beta-alumina, strontium-beta-alumina, or calcium-beta-alumina, respectively.

Other possible solid electrolyte materials for the first ion conductor include yttria-stabilized zirconia, NASICON, LISICON, KSICON, alkali-ion-exchanged versions thereof, and combinations of any of the foregoing. In these or other embodiments, chalcogenide glasses may be used as solid electrolyte materials for the first ion conductor. Exemplary chalcogenide glasses include, but are not limited to, RbI—$GeSe_2$—$Ga_2Ge_3$ and CsI—$GeSe_2$—$Ga_2Ge_3$.

The first ion conductor preferably has low electrical conductivity (high electrical resistivity) to avoid an electrical short between the first and second electrodes. The electrical resistivity of the first ion conductor is preferably greater than 1 Ω·cm, such as greater than 10 Ω·cm, greater than 100 Ω·cm, greater 1 kΩ·cm, or greater than 10 kΩ·cm, measured at 25° C.

Figure 2:
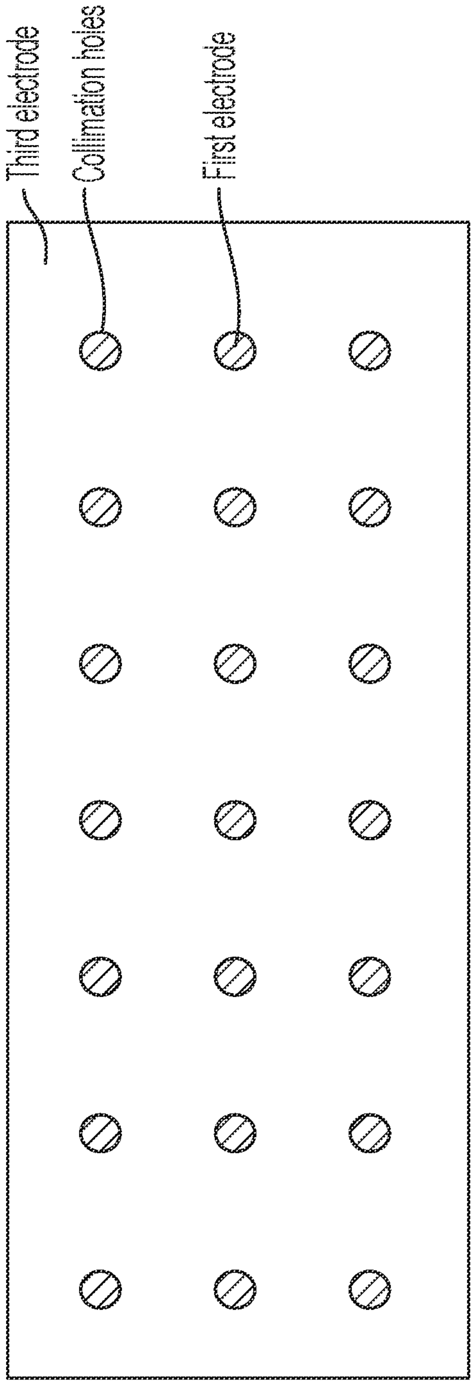
FIG. 2 is a two-dimensional top view of an atomic-beam source device, or a portion thereof, in some embodiments.

The atomic-beam source device includes one or more collimation channels to enable collimation of an atomic vapor. The collimation channels can be understood in reference to FIGS. 1 and 2. FIG. 1 is a cross-section schematic drawing of an atomic-beam source device, and FIG. 2 is a top-view schematic drawing of the atomic-beam source device of FIG. 1. The side view of collimation channels in FIG. 1 corresponds to a top view of collimation holes in FIG. 2. As such, collimation channels and collimation holes are referring to the same thing but viewed from a different perspective.

The collimation channels are positioned between the first electrode and a vapor-cell region. A vapor-cell region may be any space, material, sensor, or other device for which a collimated beam of atoms is desirable. In FIG. 1, for example, the collimated atom at the top of the figure may be in a vapor-cell region. The first electrode is positioned between the first ion conductor and the collimation channels.

The collimation channels have a length equal to the distance from channel entrance to channel exit, and a width equal to the cross-sectional effective diameter of an individual channel. Typically, all collimation channels in the device have the same length and width, as shown in FIG. 1, although that is not necessary. The average collimation-channel length (L) may be selected from about 10 microns to about 100 millimeters, preferably from about 10 microns to about 10 millimeters, and more preferably from about 100 microns to about 2 millimeters. The average collimation-channel width (effective diameter, D) may be selected from about 1 micron to about 10 millimeters, preferably from about 1 micron to about 2 millimeters, and more preferably from about 10 microns to about 500 microns.

The collimation channels preferably have a high length-to-width aspect ratio for enhanced collimation. In various embodiments, the collimation channels have a high length-to-width aspect ratio of about, or at least about, 2, 3, 4, 5, 6, 7, 8, 9, 10, 15, 20, 25, 30, 35, 40, 45, or 50, including all intervening ranges.

The collimation channels are preferably straight along their length, i.e. with low or no tortuosity in the primary atom path. When there are multiple collimation channels present, the collimation channels preferably form parallel paths, as shown in FIG. 1. Depending on the fabrication technique, slight deviations from parallelism may occur. In certain embodiments, there is a slight taper in the collimation channels.

The collimation holes (the cross-section of the collimation channels) may be circular, elliptical, square, rectangular, polygonal, or other shape. FIG. 2 depicts substantially circular (round) holes, as an exemplary embodiment only. In some embodiments, the collimation holes are rectangular, forming collimation slots. When the collimation holes are circular, the collimation channel width is the circle diameter. When the collimation holes are an arbitrary geometry, the collimation channel width is the effective diameter which is the diameter of a hypothetical circle of equivalent cross-sectional area as the actual collimation hole.

The number of collimation channels may vary widely. In some embodiments, there is a single collimation channel. Typically, there is a plurality of collimation channels. FIG. 1 explicitly depicts 7 collimation channels in the side view, and FIG. 2 explicitly depicts 21 collimation holes in the top view where the 21 holes form a 7×3 array of collimation holes. One row of 7 collimation holes in FIG. 2 is illustrated as 7 collimation channels in FIG. 1. The number of collimation channels in these drawings is merely for purposes of illustration. There may be hundreds, thousands, or more collimation channels in a device. The collimation channels may be all geometrically identical or similar (e.g., all parallel, all tapered, etc.). Alternatively, different collimation channels may be geometrically distinct.

The collimation channels may be fabricated by various chemical, electrochemical, or mechanical methods, such as wet etching, plasma etching, reactive-ion etching, deep reactive-ion etching, electrochemical etching, photoelectrochemical etching, metal-assisted electrochemical etching, mechanical drilling, electrical-discharge machining, laser machining, or water jetting, for example. Some embodiments employ machining grooves into many layers and then stacking the layers to form channels. The grooved layers may be sintered or otherwise bonded. Some embodiments make corrugated foils and then stack the foils to form channels. Some embodiments assemble and optionally bond (e.g., via sintering) a number of capillary tubes.

As shown in FIG. 1, there is preferably a gap between the first electrode and the entrance to the collimation channels, to increase the efficiency of atoms entering the channels rather than being instantly adsorbed at the wall facing the first electrode. In some embodiments, an entrance to the collimation channels touches the first electrode. This configuration is possible because even if an atom becomes immediately adsorbed near a collimation channel entrance, the atom will be electrochemically recirculated back to the second electrode/reservoir. In these or other embodiments, an entrance to the collimation channels touches the first ion conductor.

The atomic-beam source device preferably includes a third electrode at least partially inside the collimation channel(s). That is, the collimation channel walls preferably contain a third electrode. The third electrode may be disposed discontinuously on the collimation channel walls. Alternatively, the third electrode may be disposed continuously on the collimation channel walls.

The third electrode permits the conduction of electrons. The third electrode is not in electrical contact with the first electrode or the second electrode. In some embodiments, the third electrode is a porous electrically conductive structure. In some embodiments, the third electrode is a selectively permeable electrically conductive layer. For example, see U.S. Pat. No. 10,545,461 to Roper et al, which is incorporated by reference herein.

In some embodiments, the third electrode has a high diffusivity for the metal atoms that are collimated. The metal atoms which comprise the atomic vapor have a diffusivity in the third electrode that is preferably at least about $10^{-10}$ $cm^2/s$ and more preferably at least about $10^{-6}$ $cm^2/s$, measured at 25° C. or at a device operation temperature, such as 10° C., 50° C., 100° C., 150° C., or 200° C.

The third electrode is at least a fair electrical conductor. The electrical resistivity of the third electrode is preferably less than 10 kΩ·cm, more preferably less than 1 kΩ·cm, and most preferably less than 1 Ω·cm.

In some preferred embodiments, the third electrode comprises an intercalation compound, which is a material capable of being intercalated with atoms of the atomic vapor. In some embodiments, the intercalation compound is graphite, $MoS_2$, $TaS_2$, or a combination thereof, for example. The intercalation compound may be disposed in a uniform layer that consists essentially of the intercalation compound and any intercalated atoms. The thickness of the intercalation compound material is preferably less than 100 microns and more preferably less than 10 microns.

In some embodiments, the third electrode comprises particles of an intercalation compound in a matrix. The matrix is preferably a polymer binder, such as (but not limited to) poly(vinylpyrrolidone) poly(methacrylate), poly (methyl methacrylate), poly(ethyl methacrylate), poly(2-hydroxyethyl methacrylate), fluoroelastomers, cellulose resin, or a combination thereof. The polymer binder preferably has low outgassing at device operating temperature and is compatible with ultra-high vacuum. Matrix additives may be included to increase the electrical conductivity of the third electrode. For example, small conductive carbon particles may be included (e.g. Super-P® carbon black).

The third electrode is preferably graphite or another form of predominately $sp^2$-bonded carbon. Examples of $sp^2$-bonded carbon include, but are not limited to, graphite, monolayer graphene, few-layer graphene, graphene flakes, holey graphene (perforated graphene), carbon nanotubes, fullerenes (e.g., $C_{60}$, $C_{70}$, etc.), polyaromatic hydrocarbons (e.g., pentacene, rubrene, hexabenzocoronene, coronene, etc.), chemical-vapor-deposited graphitic carbon, pyrolyzed carbon-containing molecules or polymers include pyrolyzed parylenes (e.g., pyrolyzed poly(para-xylylene) or analogues thereof), or combinations of the foregoing.

The third electrode may alternatively, or additionally, include a metal dichalcogenide. In various embodiments, the third electrode includes a transition metal oxide (e.g., ZnO), a transition metal sulfide (e.g., $MoS_2$ or $TaS_2$), a transition metal selenide (e.g., $TiSe_2$), or a transition metal telluride (e.g., $TiTe_2$).

In certain embodiments, the third electrode is a porous electrically conductive layer. The porous electrically conductive layer may be a patterned metal layer directly on one surface of a second ion conductor (the second ion conductor is discussed below). The metal layer is preferably thin, such as less than 1 micron in thickness, more preferably less than 200 nanometers or less than 100 nanometers in thickness. The pattern of the metal layer is preferably such that metal regions are closely spaced, such as less than 100-micron line pitch, more preferably less than 10-micron line pitch, and most preferably less than 2-micron line pitch. The metal layer may be patterned with photolithography, electron-beam lithography, direct-write lithography, direct-write metal deposition (e.g., ion beam-induced deposition), interference lithography, etc.

Exemplary electrode materials for the porous electrically conductive layer (as third electrode) include Pt, Mo, W, Ni, Cu, Fe, Al, and combinations thereof. The porous electrically conductive layer may also entail more than one layer, such as a Ti adhesion layer and a Pt layer.

The porous electrically conductive layer preferably does not chemically interact with the ionic species conducted by the second ion conductor. For example, the porous electrically conductive layer preferably does not form an intermetallic phase and does not chemically react with the ionic species other than enabling electrochemical oxidation and reduction. Additionally, the porous electrically conductive layer preferably does not chemically interact with the second ion conductor, other than possible chemical bonding to adhere to the surface of the second ion conductor. For example, portions of the porous electrically conductive layer preferably do not form mobile ions that are transported to the second ion conductor.

The third electrode may also include a region and/or layer with high electrical conductivity to minimize sheet resistance of the third electrode. For example, the third electrode may consist of two layers: a layer that is substantially graphite and a layer that is a porous electrically conductive layer, such as a thin platinum mesh. This layered configuration may be beneficial to ensure that the electrical potential, when applied, does not vary considerably (e.g., <0.1 V) across the third-electrode surface even if an intercalation material has mediocre electrical conductivity or if an intercalation material is very thin. The highly electrically conductive layer may include Pt, Mo, W, or a combination thereof. The highly electrically conductive layer may also entail more than one sub-layer, such as a Ti adhesion sub-layer and a Pt sub-layer. The highly electrically conductive layer preferably does not form an intermetallic phase with, or otherwise chemically react with, the ionic species. The highly electrically conductive layer preferably does not chemically interact with the second ion conductor.

Figure 3:
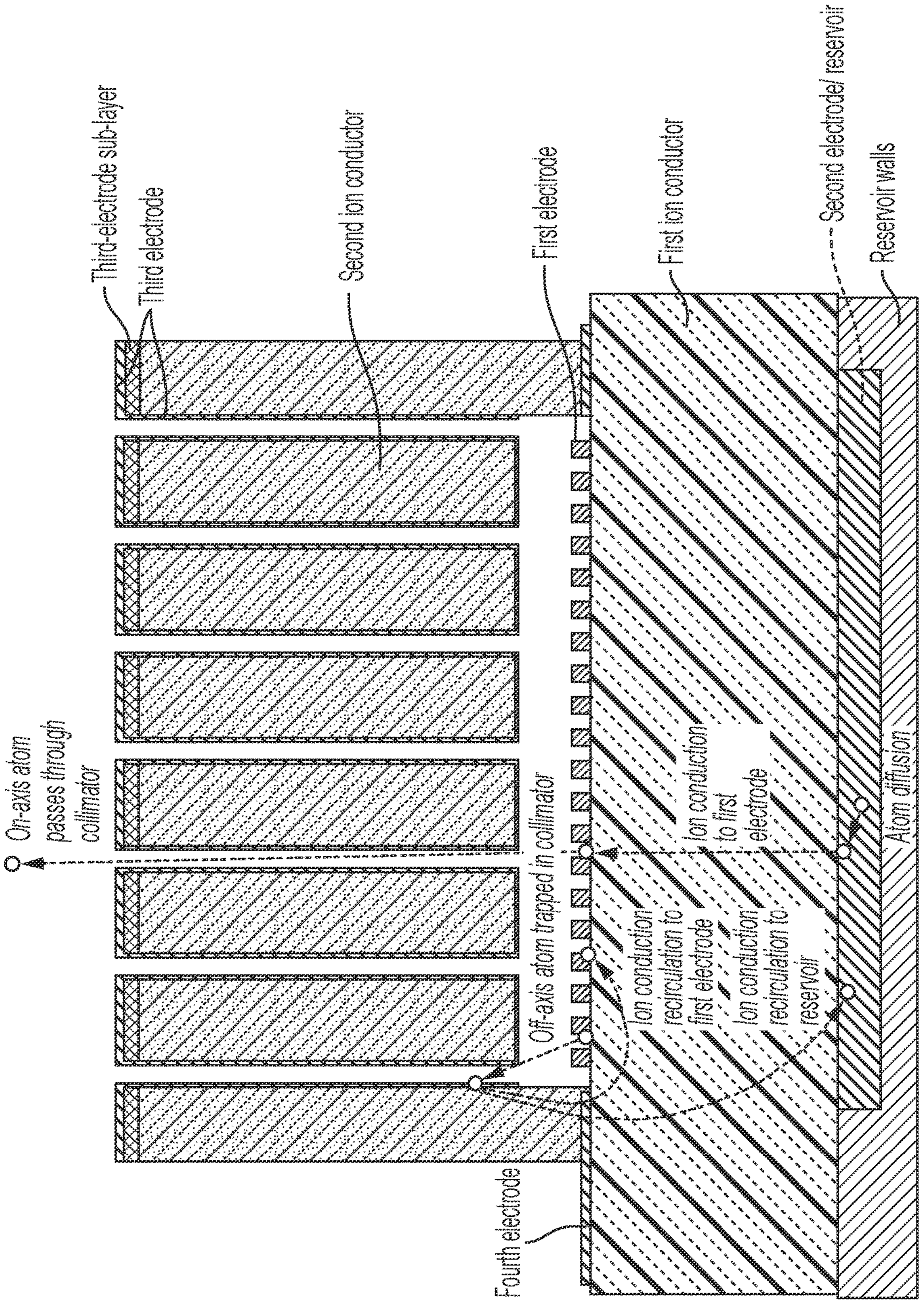
FIG. 3 is a two-dimensional, cross-sectional side view of an atomic-beam source device, or a portion thereof, in some embodiments employing a fourth electrode at the interface between first and second ion conductors.
Figure 4:
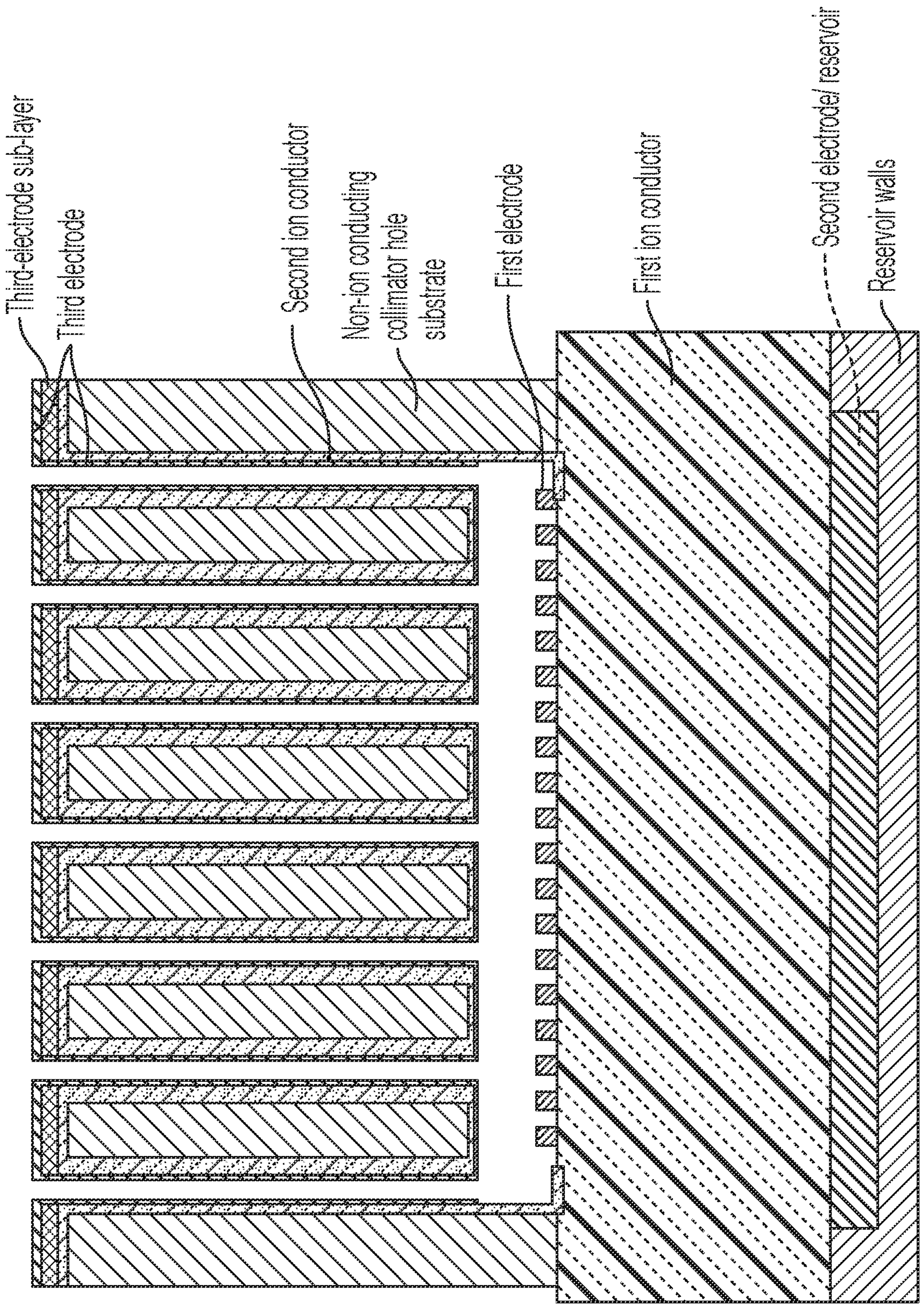
FIG. 4 is a two-dimensional, cross-sectional side view of an atomic-beam source device, or a portion thereof, in which the second ion conductor is a coating on a non-ion conducting collimator hole substrate, in some embodiments.

FIGS. 1, 3, and 4 show that at the top of the device, the third electrode is disposed on a third-electrode sub-layer, which is utilized in some preferred embodiments. The third electrode is preferably porous to atoms, while the third-electrode sub-layer is preferably not porous to atoms and has a higher electrical conductivity that the third electrode. For example, Pt lines may serve as low-electrical-resistance paths while thin graphitic carbon may serve as a porous (to atoms) and somewhat electrically conductive layer. This multi-layer configuration is particularly advantageous because graphitic carbon is an effective sinking electrode for alkali atoms, for example.

The atomic-beam source device preferably includes a second ion conductor. The second ion conductor is preferably in contact with the third electrode, or at least in ionic communication with the third electrode. More preferably, the second ion conductor is coated with and/or chemically bonded with the third electrode. The second ion conductor is also in ionic communication with the first ion conductor. The second ion conductor, along with the coated third electrode, collectively form regions between adjacent collimation channels, as depicted in FIG. 1.

The second ion conductor preferably has high ionic conductivity for a selected ionic species. The ionic conductivity is preferably at least $10^{-7}$ S/cm, and more preferably at least $10^{-5}$ S/cm, measured at 25° C. or at a device operating temperature, such as 10° C., 50° C., 100° C., 150° C., or 200° C. In various embodiments, the ionic species in the second ion conductor is selected from the group consisting of $Li^+$, $Na^+$, $K^+$, $Rb^+$, $Cs^+$, $Sr^{2+}$, $Ca^{2+}$, $Yb^{3+}$, $Hg^{2+}$, and combinations thereof (i.e., multiple types of ions may be present in the device).

The second ion conductor may be fabricated from the same material or a different material compared to the first ion conductor. The second ion conductor preferably includes a solid electrolyte. For example, the second ion conductor may be a large fraction (>50% by weight) beta-alumina (i.e., β-alumina, β"-alumina, or a combination of β-alumina and β"-alumina). When the second ion conductor is complexed with a mobile ion, such as $Na^+$, $K^+$, $Li^+$, $Rb^+$, $Cs^+$, $Sr^{2+}$, or $Ca^{2+}$, the second ion conductor becomes sodium-beta-alumina, potassium-beta-alumina, lithium-beta-alumina, rubidium-beta-alumina, cesium-beta-alumina, strontium-beta-alumina, or calcium-beta-alumina, respectively.

Other possible solid electrolyte materials for the second ion conductor include yttria-stabilized zirconia, NASICON, LISICON, KSICON, alkali-ion-exchanged versions thereof, and combinations of any of the foregoing. In these or other embodiments, chalcogenide glasses may be used as solid electrolyte materials for the second ion conductor. Exemplary chalcogenide glasses include, but are not limited to, $RbI—GeSe_2—Ga_2Ge_3$ and $CsI—GeSe_2—Ga_2Ge_3$.

In preferred devices, there is a region of direct contact between the second ion conductor and the first ion conductor. The first and second ion conductors may be sintered together, for example. In some embodiments, the second ion conductor and the first ion conductor have no interface; for example, they could be formed from the same piece of material. In some embodiments, there is an interfacial material disposed at the interface between the first and second ion conductors. The interfacial material could itself be another ion conductor or a mixed ion-electron conductor, for example.

The atomic-beam source device may be, or be contained within, a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, or an atom dispenser system, for example.

A number of variations of the atomic-beam source device are possible.

The collimation channels in one device or multiple devices may be tiled to create an atomic blade instead of an atomic beam. An atomic blade may still be shown by the side view of FIG. 1, for example, but a top view would show rectangular, elongated collimation holes instead of individual smaller holes.

The collimation channels in one device or multiple devices may be arranged to focus the atomic beams and create an atomic density peak at one point (1D), line (2D), or region (3D) in space.

An atomic beam may be aimed at an atomic sink to prevent or minimize stray atoms inside a chamber volume. Such a sink may be passive (e.g., graphite) or active (e.g., an electrochemical atom source operated in sinking mode).

There may be a fourth electrode at the interface of the first and second ion conductors, as depicted in FIG. 3. During operation, an intermediate voltage between the voltage of the third and first (or third and second) electrodes may be applied to the fourth electrode. The fourth electrode may be a fine metal pattern, intercalation compound, mixed ion-electron conductor, or composite electrode, for example. Neutral atoms are formed at one side of the fourth electrode and then re-ionized on the other side of the fourth electrode. The fourth electrode facilitates ion communication between the first and second ion conductors without needing to fabricate the ion conductors in one piece or sinter them together.

There may be an additional electrode (not depicted in the drawings) that does not face the collimated channels. The additional electrode may be used primarily for loading the atom reservoir. The additional electrode is preferably disposed on the first ion conductor. Alternatively, or additionally, the additional electrode is disposed on the second ion conductor.

As shown in FIG. 4, the second ion conductor may be a coating on a non-ion conducting collimator hole substrate. The ion-conducting coating may be applied via chemical vapor deposition, physical vapor deposition (e.g. evaporation or sputtering), atomic layer deposition, sol-gel processing, etc. The collimator hole substrate may be a dielectric material or an electron-conducting material. For example, the collimator hole substrate may be a semiconductor (e.g., silicon), a dielectric material (e.g., silicon dioxide, α-alumina, or borosilicate glass), or a metal (e.g., stainless steel, platinum, molybdenum, titanium, tungsten, or nickel). In these embodiments, the dielectric or electron-conducting collimation channel wall substrate need not be ion-conducting, since the coating itself is ion-conducting.

The atomic-beam source device may be part of a system including a vacuum chamber, vacuum pumps, lasers, windows, optics, photodetectors, RF sources, etc. The system may be an atomic physics instrument, such as (but not limited to) a clock, frequency source, accelerometer, gyroscope, gravimeter, electrometer, magnetometer, or gradiometer. The atomic-beam source device may be utilized for molecular-beam epitaxy or other semiconductor fabrication processes.

The atomic-beam source device may include a vapor chamber volume. The vapor chamber volume may be in contact with the first electrode and preferably is in contact with the first ion conductor, as shown in FIG. 1. The vapor chamber volume may be the open region between the first electrode and the bottom of the second ion conductor. The vapor chamber contains an atomic vapor, such as a vapor of an alkali metal or an alkaline earth metal, or another atomic metal, such as a rare earth metal (e.g., Yb) or mercury. The atomic vapor may be isotopically enriched or purified. The vapor chamber may be under partial vacuum and may contain nothing in addition to the atomic vapor. In some embodiments, the vapor chamber contains additional gases, such as $N_2$, $CH_4$, He, Ar, Ne, Xe, or $NH_3$. The additional gases may be used as a buffer gas or as spin exchange gas, for example. The additional gases may be isotopically enriched or purified.

The first electrode may be in contact with the first ion conductor (as depicted in FIGS. 1, 3, and 4), in contact with a vapor chamber volume, or in contact with both the first ion conductor and a vapor chamber volume. The second electrode may or may not be in contact with the vapor chamber volume.

The vapor chamber may be hermetically sealed or may be in fluid communication with a larger system. For example, the vapor chamber may be part of a high-vacuum system containing pumps, pressure/vacuum gauges, atom dispensers, getters, getter pumps, etc.

One or more walls of the vapor chamber volume may be substantially transparent at relevant wavelengths such that there is an optical path through the vapor chamber. In some embodiments, there are three orthogonal optical paths to facilitate the formation of a magneto-optical trap (MOT) and atomic cloud imaging. The optical paths do not need to be orthogonal when entering a vapor chamber. For example, there could be mirrors inside the vapor chamber that make the optical paths orthogonal only inside the vapor chamber. There could be one optical path entering the chamber, which optical path is split within the vapor chamber. In some embodiments, within the vapor chamber, along three different orthogonal axes based on the location of trapped atoms, two optical paths (one in each direction) are located on each of the three axes.

An "optical path" is the path of a spectroscopic probing beam of light (or other type of laser beam) into a vapor chamber. The optical path is optional in the sense that the device itself does not inherently include the beam of light, while operation of a device (in some embodiments) at least periodically means that an optical path is traversing into or through the vapor chamber. Also note that an optical path is not necessarily a straight line. Internal reflectors or refractive elements may be included in the system, so that optical reflection occurs. In that case, the optical beam could enter and exit along the same wall (detection probe on the same side as the laser source), for example.

It shall be understood that laser beams may or may not be present in any device described in this specification. That is, a source of laser beams may be present but not operating, in which case no laser beams will enter or be present within the vapor chamber. Or a vapor chamber may be provided without a source of laser beams, which source may be added at a later time, prior to operation of the device. Likewise, magnetic field sources (external to the device) and magnetic field lines (within the device) may or may not be actually present.

The atomic-beam source device may include an atom reservoir that is distinct from the second electrode/reservoir. This additional atom reservoir is preferably in contact with the second electrode. The atom reservoir may be comprised, in part or in whole, by graphite or graphitic carbon. The graphite or graphitic carbon provides electrical conductivity and also a means of storing atoms, such as in a graphite intercalation compound.

The atom reservoir may contain metal in the vapor phase and possibly in solid and/or liquid phases as well. The atomic species contained within the atom reservoir is preferably the reduced form of the same ionic species as in the first ion conductor. Alternatively, a different atomic species may be contained within the atom reservoir.

The atom reservoir and/or the second electrode may be designed to accommodate any mechanical strain from a changing reservoir volume due to the loss or introduction of atoms. For instance, a gap may be situated between an intercalation compound and the reservoir walls to permit expansion of the intercalation compound without straining the reservoir walls. The reservoir walls may be designed to elastically and/or plastically deform. This configuration may be accomplished through material selection (e.g. metals, polymers, or a combination thereof). Alternatively, or additionally, this configuration may be accomplished through reservoir design (e.g. a bellows).

The atom reservoir and/or the second electrode has walls that are preferably impermeable to the atomic species contained inside the reservoir. The walls are preferably thin films and supported by a substrate (e.g. glass, Si, alumina, etc.). The side(s) of the reservoir walls that face the interior of the reservoir preferably do not chemically interact with the ionic species. For example, the reservoir walls do not form an intermetallic phase with the ionic species and do not chemically react with the ionic species. Exemplary reservoir wall materials include Pt, Mo, W, or a combination thereof, for the walls that face the interior of the reservoir. When there are side(s) of the reservoir walls that touch the first ion conductor, the reservoir walls preferably do not chemically interact with the first ion conductor, other than chemical bonding to adhere to the first ion conductor. Exemplary reservoir wall materials include Pt, Mo, W, or a combination thereof, for the walls (if any) that touch the first ion conductor.

Multiple ion conductors, each with their own electrodes, may be present in a single device. Multiple first electrodes may or may not be electrically connected through electrical leads or electrical traces. Likewise, multiple second electrodes may or may not be electrically connected through electrical leads or electrical traces.

Multiple sets of first electrodes, ion conductors, and second electrodes may generally be present. In some embodiments, two or more first (front) electrodes are employed. In these or other embodiments, two or more second (back) electrodes are employed. In any of these embodiments, or other embodiments, two or more ion conductors are employed.

Each electrode is typically connected to an electrical lead fabricated from an electrically conductive material. A lead is an electrical connection consisting of a length of wire, metal pad, metal trace, or other electrically conductive structure. Leads are used to transfer power and may also provide physical support and potentially provide a heat sink. In some embodiments, a device is provided without such leads, which may be added at a later time, before use.

There are many options for the electrical connections to the first and second electrodes of the atomic-beam source device. The electrical connections may be connected to bond pads for connection to an external circuit. The electrical connections may include through-wafer vias, patterned electrically conductive thin films, doped regions of semiconductors, wire bonds, or a combination thereof. Patterned thin films may be parallel with the first electrode, such as when the first electrode is substantially flat. Parts of patterned thin films may be at an angle with the first electrode. In some embodiments, the electrode connections travel out of the plane of the electrode to which it is connected.

The atomic-beam source device may be contained within an oven. The purpose of the oven may be to control the temperature of the device at a temperature above the ambient temperature, for example. In principle, the atomic-beam source device may be contained within any sort of temperature-controlled system, for heating or cooling the device.

The atomic-beam source device may be operated at a wide range of temperatures and pressures. In various embodiments, the atomic-beam source device may be operated at a temperature from about-200° C. to about 500° C., preferably from about-50° C. to about 250° C., and more preferably from about 10° C. to about 200° C. After atoms are emitted from the atomic-beam source device, those atoms may be cooled to ultra-low temperatures (e.g., $10^{-7}$ K to $10^{-3}$ K) as needed for some applications or measurements. In various embodiments, the atomic-beam source device may be operated at a pressure from about 7600 torr (10 atm) to about $10^{-14}$ torr, preferably from about $10^{-3}$ to about $10^{-13}$ torr, and more preferably from about $10^{-7}$ torr to about $10^{-12}$ torr.

The atomic-beam source device may include an integrated heater. The integrated heater may be a resistive heater, such as a thin wire or a patterned thin metal trace (e.g. Pt or nickel-chromium alloy). The integrated heater may also be a radiative heater or a thermoelectric heater, for example. The integrated heater preferably includes a temperature sensor, such as a thermocouple or a resistance temperature detector (e.g., Pt). Preferably, the heater is in good thermal communication with the region of the first ion conductor that is near the first electrode.

In some embodiments, the atomic-beam source device is a chip-scale device that is mounted or integrated on a microelectromechanical systems (MEMS) heater stage to minimize heater power.

When an integrated heater is included in the device, the heater may further comprise one or more thermal isolation structures. A thermal isolation structure minimizes heat transfer from the heated region of the device to the colder, ambient environment. A thermal isolation structure is configured to minimize heat loss out of the heated region into a cold region, by functioning as insulation to retain heat within the heated region. The thermal isolation structure preferably has a high value of thermal resistance, as further explained below.

A thermal isolation structure may be made of the same material and layer as the atom reservoir walls, in some embodiments. In these or other embodiments, a thermal isolation structure may be made of the same material and layer as the first ion conductor. The thermal isolation structure is preferably polymer, ceramic, or glass, although metal may be utilized as well, or a combination of the foregoing.

In some embodiments, the thermal isolation structure is fabricated from a material selected from the group consisting of β-alumina (e.g., Rb-β-alumina, Na-β-alumina, or Sr-β-alumina), β"-alumina (e.g., Rb-β"-alumina, Na-β"-alumina, or Sr-β"-alumina), «-alumina, silica, fused silica, quartz, borosilicate glass, silicon, silicon nitride, silicon carbide, and combinations thereof.

The thermal isolation structure may be designed to accommodate materials with any thermal conductivity. High-thermal-conductivity materials will benefit from long, high-aspect ratio connections, while lower-thermal-conductivity materials may utilize shorter, stubbier connections.

An important design parameter for the thermal isolation structure (when present) is the thermal resistance. The thermal resistance is the temperature difference across the thermal isolation structure when a unit of heat energy flows through it in unit time; or equivalently, the temperature difference, at steady state, between two defined surfaces of the thermal isolation structure that induces a unit heat flow rate. Because the desire is for a low heat flow rate, a high temperature difference is desired, i.e., a high value of thermal resistance. The thermal resistance of a thermal isolation structure is preferably at least 100 K/W, more preferably at least 1,000 K/W, and most preferably at least 10,000 K/W.

A thermal isolation structure may also be configured to impart mechanical strain relief, thereby preventing mechanical damage due to thermal strains that build up when the first ion conductor is heated to a higher temperature than the base substrate. In some embodiments, a thermal isolation structure is mechanically connected to a base substrate, for example through a frame. Preferably, the thermal isolation structure is designed to reduce thermal stress or residual stress by at least 2×, preferably at least 10×, and more preferably at least 100× from one side of the thermal isolation structure to the other side. The thermal or residual stress reduction is not an inherent material property, but is a function of the geometric design of the thermal isolation structure and its material properties.

In some embodiments, a thermal isolation structure is a suspension beam. Typically, a plurality of suspension beams will be present to connect the heated region to the cold region. The heated region only contacts the cold region through the suspension beams. The suspension beams may be straight beams, folded beams, tortuous beams, circular beams, and so on. The suspension beams may be made in any one (or more) layers in a planar process, such as surface or bulk micromachining. The rest of the heated region may be surrounded by vacuum or a vapor phase (e.g., containing an inert gas), either of which has a high thermal resistance to the cold region. As an alternative, the vapor/vacuum region may include a thermal insulator material, such as an aerogel.

In some embodiments, a thermal isolation structure has a thin metal film patterned on it for electrical interconnections. In some preferred embodiments, a resistive heater and a temperature sensor are patterned on (in contact with) the same layer as at least one thermal isolation structure. Preferably, electrical connections to the heater and the temperature sensor are also patterned on one or more thermal isolation structures. Optionally, part or all of the heater may be patterned on a thermal isolation structure or on multiple thermal isolation structures. In some embodiments, a thin film resistive heater is patterned on one or more sides of the same layer as a thermal isolation structure. In cases where the first ion conductor is separate from the thermal isolation structure, the heater may be patterned on the same side or the opposite side of the thermal isolation structure compared to the position of the first ion conductor. In cases where the first ion conductor is the same as a thermal isolation structure, or a layer thereof, the heater may be patterned on either side of the first ion conductor—that is, on the first-electrode side and/or on the second-electrode side. See commonly owned U.S. patent application Ser. No. 16/573,684, filed on Sep. 17, 2019, which is hereby incorporated by reference herein.

The integration of the heater and thermal isolation structures within the system enables low system power input. The system power input for controlling vapor density of metal atoms is preferably less than about 500 mW, more preferably less than about 200 mW, and most preferably less than about 100 mW. In various embodiments, the system power input for sourcing and/or sinking metal atoms is about 1000, 500, 400, 300, 200, 100, 50, 25, or 10 mW.

In some embodiments in which high vapor density is desirable, the density of metal atoms may be at least $10^9$ atoms per $cm^3$, preferably at least $10^{10}$ per $cm^3$, and more preferably at least $10^{11}$ per $cm^3$. In some embodiments in which low vapor density is desirable, the density of metal atoms may be below $10^8$ atoms per $cm^3$, preferably below $10^7$ atoms per $cm^3$. In various embodiments, the density of metal atoms if about, at least about, or at most about $10^6$ atoms per $cm^3$, $10^7$ atoms per $cm^3$, $10^8$ atoms per $cm^3$, $10^9$ atoms per $cm^3$, $10^{10}$ atoms per $cm^3$, $10^{11}$ atoms per $cm^3$, or $10^{12}$ atoms per $cm^3$.

The atomic-beam source device may be situated inside a magnetic field. Coils of wire driven in an anti-Helmholtz configuration surrounding the vapor cell can be used to generate magnetic fields required for a trap. Other magnetic-field sources (such as magnets or materials capable of generating magnetic flux) may be utilized to generate magnetic fields within the device.

The atomic-beam source device may be fabricated on a wide variety of length scales. The length scale may be characterized by the square root of the first electrode area. This length scale may vary from 10 m to 1 micron, with 1 m to 10 mm being typical for macroscale atomic timing and navigation systems, and 30 mm to 10 microns being typical for chip-scale atomic timing and navigation systems.

Chip-scale devices are preferably constructed using microfabrication techniques, including some or all of lithography, evaporation, shadow-masking, evaporation, sputtering, wafer bonding, die bonding, anodic bonding, glass frit bonding, metal-metal bonding, and etching.

The atomic-beam source device may also contain an atom chip for intra-system generation of magnetic fields for microtraps. Combining the atomic-beam source device with an atom chip provides for device miniaturization.

The atom chip and the first ion conductor need not be the same size. An atom chip may be disposed on a different surface than the first ion conductor. An atom chip may be fabricated on a base chip that is heterogeneously integrated with the first ion conductor. The atom chip may be closer to the vapor volume than the first ion conductor, in which case the vapor atoms may pass around the edges of the atom chip or through one of more holes in the atom chip, for example. The first ion conductor may be closer to the vapor volume than the atom chip, in which case the trapped population of cold atoms may be situated above the first ion conductor.

An atom chip may be fabricated directly on the first ion conductor or on the first electrode, for example. The atom chip traces that generate the magnetic fields for microtraps may be adjacent to the first electrode traces in this case. The atom chip traces that generate the magnetic fields for microtraps may be separated from the first ion conductor by a material which is both an electronic insulator and an ionic insulator (e.g., glass materials).

Some variations provide a method of electrochemically recirculating atoms adsorbed on atom-beam collimator channel walls, the method comprising:

(a) providing an atomic-beam source device that emits a metal vapor of neutral metal atoms, wherein the atomic-beam source device comprises (i) a first electrode; (ii) a second electrode that is electrically isolated from the first electrode; (iii) a first ion conductor interposed between the first electrode and the second electrode, wherein the first ion conductor is capable of transporting metal ions, and wherein the first ion conductor is in contact with the first electrode and with the second electrode; and (iv) one or more collimation channels disposed outwardly from the first ion conductor, wherein the collimation channels are surrounded by collimation channel walls;

(b) applying a first voltage between the first and second electrodes to source the metal vapor out of the collimation channels, wherein a portion of the metal vapor adsorbs onto collimation channel walls as adsorbed metal atoms; and (c) applying a second voltage between the first and second electrodes to recirculate at least some of the adsorbed metal atoms from the collimation channel walls to the first electrode and/or to the second electrode.

In some methods, the second voltage is selected to recirculate at least some of the adsorbed metal atoms to the first electrode. In these or other methods, the second voltage is selected to recirculate at least some of the adsorbed metal atoms to the second electrode. In certain embodiments, the method comprises repeatedly applying the first voltage to source the metal vapor out of the collimation channels and then applying the second voltage to recirculate at least some of the adsorbed metal atoms from the collimation channel walls to the second electrode and/or to the first electrode.

Preferably, application of the second voltage between the first and second electrodes recirculates at least 90% of the adsorbed metal atoms from the collimation channel walls to the first electrode and/or to the second electrode.

Other variations provide a method of electrochemically recirculating atoms adsorbed on atom-beam collimator channel walls, the method comprising:

(a) providing an atomic-beam source device that emits a metal vapor of neutral metal atoms, wherein the atomic-beam source device comprises (i) a first electrode; (ii) a second electrode that is electrically isolated from the first electrode; (iii) a first ion conductor interposed between the first electrode and the second electrode, wherein the first ion conductor is capable of transporting metal ions, and wherein the first ion conductor is in contact with the first electrode and with the second electrode; and (iv) one or more collimation channels disposed outwardly from the first ion conductor, wherein the collimation channels are surrounded by collimation channel walls; and (b) applying one or more voltages between the first and second electrodes to source the metal vapor out of the collimation channels, wherein, during application of the one or more voltages, a portion of the metal vapor adsorbs onto collimation channel walls as adsorbed metal atoms, and wherein, during application of the one or more voltages, at least some of the adsorbed metal atoms are recirculated from the collimation channel walls to the first electrode and/or to the second electrode.

In some methods, the one or more voltages between the first and second electrodes are selected to recirculate at least some of the adsorbed metal atoms to the first electrode. In these or other methods, the one or more voltages are selected to recirculate at least some of the adsorbed metal atoms to the second electrode.

In some embodiments, application of the one or more voltages between the first and second electrodes preferably recirculates at least 90% of the adsorbed metal atoms from the collimation channel walls to the first electrode and/or to the second electrode.

Figure 5A:
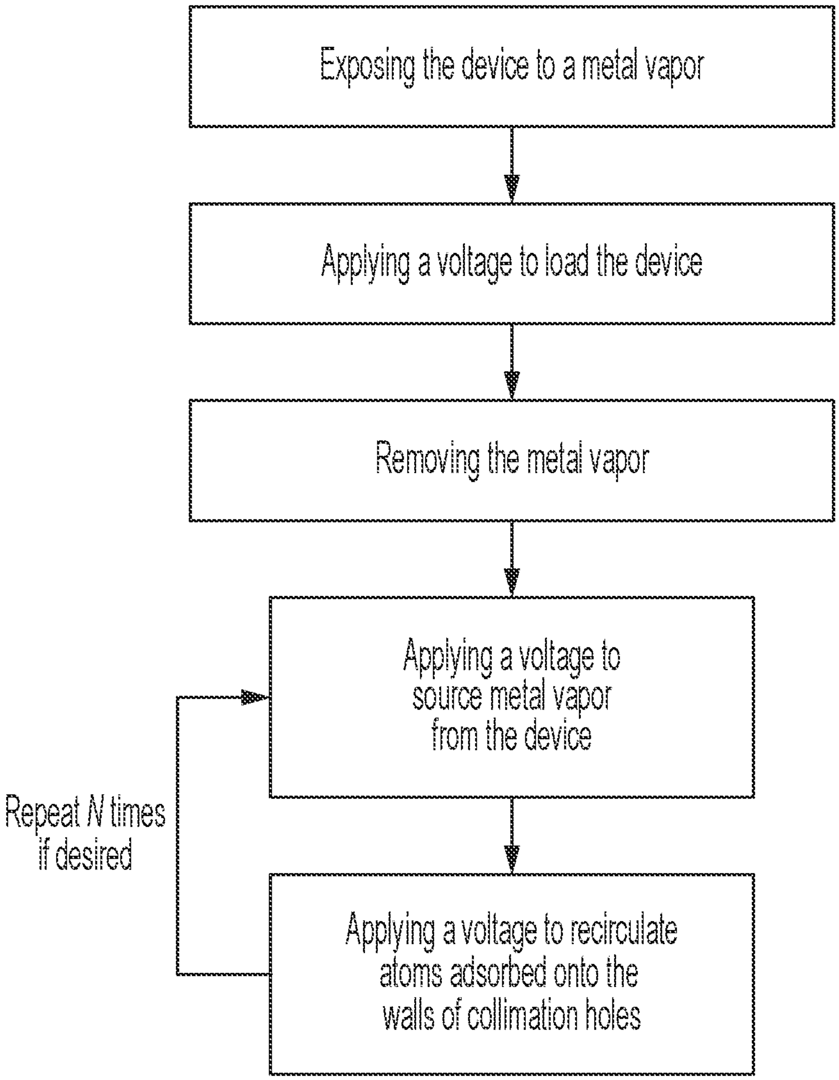
FIG. 5A is an exemplary method flowchart, in some embodiments.
Figure 5B:
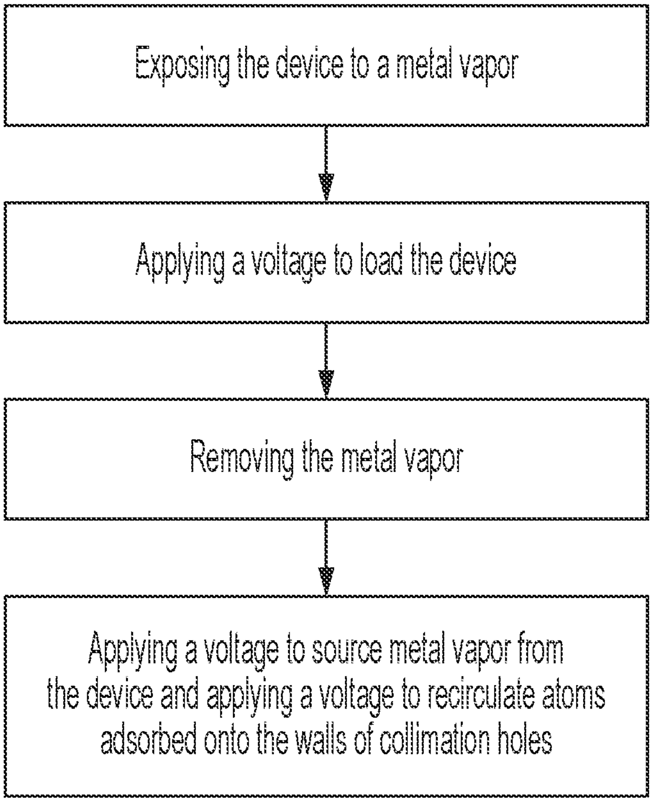
FIG. 5B is an exemplary method flowchart, in some embodiments.

FIGS. 5A and 5B are exemplary method flowcharts, in some embodiments.

An exemplary method of using the atomic-beam source device entails optionally heating the device, either before or after loading. The device may be exposed to a metal vapor, and a voltage may be applied between electrodes for loading the device with atoms. A voltage may be applied between the first and second electrodes such that the voltage on the second electrode is lower than the first electrode. Alternatively, or additionally, a voltage may be applied between the third and second electrodes such that the voltage on the second electrode is lower than the third electrode. Atoms will be loaded from the metal vapor into the reservoir (second electrode). The metal vapor may then be removed.

Next, a voltage may be applied to source metal vapor from the device. A voltage may be applied between the first and second electrodes such that the voltage on the first electrode is lower than the second electrode. This will transport atoms from the reservoir to the surface near the first electrode. These atoms may then evaporate from the surface.

Some evaporated atoms may enter the collimation channels. Atoms which pass through the collimation channels without touching the channel walls will form an atomic beam emitted from the device (as normally intended). Atoms which enter the collimation channels, but hit the channel walls during their transport, typically adsorb onto the channels walls. The adsorbed atoms may be recirculated and recycled, as follows. Some of the adsorbed atoms ma desorb and exit the collimation channels, which is generally undesirable.

A voltage may be applied to recirculate atoms adsorbed onto the walls of collimation channels. In some embodiments, a voltage is applied between the third and first electrodes such that the voltage on the first electrode is lower than the third electrode. This will transport atoms from the surface near the third electrode (collimation channel walls) to the surface near the first electrode where the atoms can evaporate into the collimation region again. Alternatively, or additionally, a voltage may be applied between the third and second electrodes such that the voltage on the second electrode is lower than the third electrode. This will transport atoms from the surface near the third electrode (collimation channel walls) to the reservoir. The atom recirculation may be applied simultaneously with atom sourcing, after atom sourcing, or interleaved with sourcing (e.g., periodic recirculation, sourcing, recirculation, sourcing, etc.).

In various embodiments, the applied voltage between two electrodes is about 10 mV, 25 mV, 50 mV, 100 mV, 200 mV, 300 mV, 400 mV, or 450 mV, or about 0.5 V, 1 V, 5 V, 10 V, 20 V, 50 V, 75 V, or 100 V.

The device power input for sourcing metal atoms is preferably less than about 500 mW, more preferably less than about 200 mW, and most preferably less than about 100 mW. In various embodiments, the device power input for sourcing metal atoms is about 500 mW, 400 mW, 300 mW, 200 mW, 100 mW, 75 mW, 50 mW, 25 mW, or 10 mW, or less.

Fast system response times may be achieved with the atomic-beam source device. The device response time (for sourcing metal atoms) may be less than about 10 seconds. In various embodiments, the device response time is about 10, 5, 1, 0.5, 0.2, 0.1, 0.05, 0.04, 0.03, 0.02, or 0.01 seconds. The device may be operated on longer time scales, such as about 1 minute, 10 minutes, 1 hour, 1 day, or even longer.

In some methods of using the device, atom pulsing is desirable. In these embodiments, the atom source may be electrochemically switched on and off, repeatedly, to pulse the atomic beam. In conventional beam sources, switching requires significantly cooling the atom source which is very slow (typically at least 1 hour) or physically shuttering which is complex, not reliable, and eventually leads to mechanical failure. Switching the beam source can save atoms (longer device lifetime), reduce power, and reduce excess atomic vapor for longer cold atom lifetimes.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An atomic-beam source device comprising:

a first electrode;

a second electrode that is electrically isolated from said first electrode;

a first ion conductor interposed between said first electrode and said second electrode, wherein said first ion conductor is capable of transporting metal ions, and wherein said first ion conductor is in contact with said first electrode and with said second electrode; and one or more collimation channels disposed outwardly from said first ion conductor, wherein said collimation channels are surrounded by collimation channel walls.

2. The atomic-beam source device of claim 1, wherein said first electrode contains a porous and permeable electrically conductive layer or structure.

3. The atomic-beam source device of claim 1, wherein said second electrode contains an atom-transporting phase capable of storing and transporting neutral metal atoms.

4. The atomic-beam source device of claim 3, wherein said neutral metal atoms are reduced forms of said metal ions, and wherein said metal ions are selected from the group consisting of alkali metal ions, alkaline earth metal ions, rare earth metal ions, and mercury ions.

5. The atomic-beam source device of claim 1, wherein said second electrode is encapsulated by said first ion conductor and a reservoir wall.

6. The atomic-beam source device of claim 1, wherein said first ion conductor comprises a solid electrolyte.

7. The atomic-beam source device of claim 1, wherein said first ion conductor comprises a material selected from the group consisting of β-alumina, β"-alumina, NASICON, LISICON, KSICON, chalcogenide glasses, and combinations thereof.

8. The atomic-beam source device of claim 1, wherein said collimation channel walls contain a third electrode.

9. The atomic-beam source device of claim 8, wherein said third electrode is disposed discontinuously on said collimation channel walls.

10. The atomic-beam source device of claim 8, wherein said third electrode is disposed continuously on said collimation channel walls.

11. The atomic-beam source device of claim 1, wherein said third electrode contains a porous and permeable electrically conductive material.

12. The atomic-beam source device of claim 1, wherein said third electrode contains a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

13. The atomic-beam source device of claim 1, wherein said atomic-beam source device further comprises a second ion conductor that is capable of transporting said metal ions.

14. The atomic-beam source device of claim 13, wherein said second ion conductor is the same material as said first ion conductor.

15. The atomic-beam source device of claim 13, wherein said second ion conductor comprises a solid electrolyte.

16. The atomic-beam source device of claim 13, wherein said second ion conductor comprises a material selected from the group consisting of β-alumina, β"-alumina, NASICON, LISICON, KSICON, chalcogenide glasses, and combinations thereof.

17. The atomic-beam source device of claim 13, wherein said second ion conductor is a coating disposed on a dielectric or electron-conducting collimation channel wall substrate.

18. The atomic-beam source device of claim 13, wherein said second ion conductor is in direct contact with said first ion conductor.

19. The atomic-beam source device of claim 18, wherein said collimation channels are surrounded by collimation channel walls containing a third electrode, and wherein said second ion conductor is in ionic communication with said third electrode and with said first ion conductor.

20. The atomic-beam source device of claim 8, wherein said atomic-beam source device further comprises a fourth electrode disposed at an interface between said first ion conductor and a second ion conductor that is capable of transporting said metal ions.

21. A method of electrochemically recirculating atoms adsorbed on atom-beam collimator channel walls, said method comprising:

providing an atomic-beam source device according to claim 1, wherein said atomic-beam source device emits a metal vapor of neutral metal atoms;

applying a first voltage between said first electrode and said second electrode to source said metal vapor out of said collimation channels, wherein a portion of said metal vapor adsorbs onto collimation channel walls as adsorbed metal atoms; and applying a second voltage between said first electrode and said second electrode to recirculate at least some of said adsorbed metal atoms from said collimation channel walls to said first electrode and/or to said second electrode.

22. The method of claim 21, wherein said second voltage is selected to recirculate at least some of said adsorbed metal atoms to said first electrode.

23. The method of claim 21, wherein said second voltage is selected to recirculate at least some of said adsorbed metal atoms to said second electrode.

24. The method of claim 21, wherein said method comprises repeatedly applying said first voltage to source said metal vapor out of said collimation channels and then applying said second voltage to recirculate at least some of said adsorbed metal atoms from said collimation channel walls to said second electrode and/or to said first electrode.

25. The method of claim 21, wherein application of said second voltage recirculates at least 90% of said adsorbed metal atoms from said collimation channel walls to said first electrode and/or to said second electrode.

26. A method of electrochemically recirculating atoms adsorbed on atom-beam collimator channel walls, said method comprising:

providing an atomic-beam source device according to claim 1, wherein said atomic-beam source device emits a metal vapor of neutral metal atoms; and applying one or more voltages between said first electrode and said second electrode to source said metal vapor out of said collimation channels, wherein, during application of said one or more voltages, a portion of said metal vapor adsorbs onto collimation channel walls as adsorbed metal atoms, and wherein, during application of said one or more voltages, at least some of said adsorbed metal atoms are recirculated from said collimation channel walls to said first electrode and/or to said second electrode.

27. The method of claim 26, wherein said one or more voltages are selected to recirculate at least some of said adsorbed metal atoms to said first electrode.

28. The method of claim 26, wherein said one or more voltages are selected to recirculate at least some of said adsorbed metal atoms to said second electrode.

29. The method of claim 26, wherein application of said one or more voltages recirculates at least 90% of said adsorbed metal atoms from said collimation channel walls to said first electrode and/or to said second electrode.

* * * * *